United States Patent
Sonderegger et al.

(10) Patent No.: US 9,573,461 B2
(45) Date of Patent: Feb. 21, 2017

(54) FILTER DEVICE AND ARRANGEMENT FOR VENTILATING A TANK COMPRISING A FILTER DEVICE

(75) Inventors: Sigurd Sonderegger, Askim (SE); Jonas Lexén, Vallda (SE)

(73) Assignee: Volvo Lastvagnar AB, Göteborg (SE)

( * ) Notice: Subject to any disclaimer, the term of this patent is extended or adjusted under 35 U.S.C. 154(b) by 190 days.

(21) Appl. No.: 14/354,569

(22) PCT Filed: Oct. 31, 2011

(86) PCT No.: PCT/SE2011/000195
§ 371 (c)(1),
(2), (4) Date: Jun. 12, 2014

(87) PCT Pub. No.: WO2013/066217
PCT Pub. Date: May 10, 2013

(65) Prior Publication Data
US 2015/0231964 A1   Aug. 20, 2015

(51) Int. Cl.
*B60K 15/035* (2006.01)
*B01D 46/00* (2006.01)
(Continued)

(52) U.S. Cl.
CPC ......... *B60K 15/035* (2013.01); *B01D 46/0043* (2013.01); *B01D 46/08* (2013.01); *B01D 50/002* (2013.01); *B60K 2015/03236* (2013.01)

(58) Field of Classification Search
CPC .................. B60K 15/035; B60K 2015/03236; B01D 50/002; B01D 45/08; B01D 46/0043
See application file for complete search history.

(56) References Cited

U.S. PATENT DOCUMENTS

| | | | | |
|---|---|---|---|---|
| 2,421,776 A | * | 6/1947 | Dollinger ........... | B01D 46/0012 55/323 |
| 3,038,211 A | * | 6/1962 | Luedi ................. | B01D 46/0043 210/493.1 |

(Continued)

FOREIGN PATENT DOCUMENTS

| GB | 2065623 A | 7/1981 |
|---|---|---|
| JP | 2008106734 | 5/2008 |

(Continued)

OTHER PUBLICATIONS

Supp. European Search Report (Jun. 30, 2016) for corresponding European App. EP 11 87 5228.

(Continued)

*Primary Examiner* — Amber R Orlando
*Assistant Examiner* — Britanny Precht
(74) *Attorney, Agent, or Firm* — WRB-IP LLP

(57) ABSTRACT

A filter device, particularly an air breather filter device for venting a fuel tank, includes a housing with a first port provided as an inlet in normal operation of the filter device and a second port provided as an outlet under normal operation of the filter device. The housing encloses at least one filter and an air passage extends from the first port to the second port passing through the filter. Inside the housing a baffle unit is arranged in the housing for covering the at least one first filter in relation to the second port, wherein the baffle unit is arranged to deflect a fluid flow entering the filter device through the second port.

10 Claims, 12 Drawing Sheets

(51) Int. Cl.
  *B01D 50/00* (2006.01)
  *B01D 45/08* (2006.01)
  *B60K 15/03* (2006.01)
  *B01D 46/08* (2006.01)

(56) References Cited

U.S. PATENT DOCUMENTS

| | | | | |
|---|---|---|---|---|
| 3,969,095 | A * | 7/1976 | Kurahashi | B01D 46/0043 55/418 |
| 4,388,087 | A * | 6/1983 | Tipton | B01D 45/16 175/206 |
| 4,740,221 | A * | 4/1988 | Howeth | B01D 46/0067 55/302 |
| 4,838,901 | A * | 6/1989 | Schmidt | B01D 46/0024 55/320 |
| 5,106,397 | A * | 4/1992 | Jaroszczyk | B01D 46/0043 181/276 |
| 5,322,533 | A * | 6/1994 | Todorovic | B01D 46/0043 454/58 |
| 5,549,722 | A * | 8/1996 | Zemaitis | B01D 50/002 55/320 |
| 7,367,998 | B2 | 5/2008 | Moessinger | |
| 2003/0057152 | A1 * | 3/2003 | Haridas | C02F 3/282 210/603 |
| 2004/0055470 | A1 * | 3/2004 | Strauser | E01H 1/0827 96/417 |
| 2006/0157117 | A1 | 7/2006 | Scott | |
| 2012/0159911 | A1 * | 6/2012 | Maloney | B01D 46/0031 55/385.3 |

FOREIGN PATENT DOCUMENTS

| | | |
|---|---|---|
| JP | 2009197594 | 9/2009 |
| WO | 2010022431 A1 | 3/2010 |

OTHER PUBLICATIONS

Japanese Official Action (translation) (May 13, 2015) for corresponding Japanese App. 2014-535750.
International Search Report (Jul. 13, 2012) for corresponding International Application PCT/SE2011/000195.

* cited by examiner

FILTER DEVICE AND ARRANGEMENT FOR VENTILATING A TANK COMPRISING A FILTER DEVICE

BACKGROUND AND SUMMARY

The invention relates to a filter device, particularly an air breather filter device for a tank, and an arrangement for ventilating a tank comprising a filter device.

Air breather filters are commonly utilized in vehicles, particularly commercial vehicles such as trucks and buses. They consist of filter paper to be able to catch especially small particles of down to 4 μm and smaller. These small particles are difficult to filtrate on fuel filters. Trapping these small particles increases the lifetime of engine components such as fuel pump and injectors strongly. When the filter paper gets wet, the pressure drop through the filter paper is increased dramatically. An amount of only 5 g diesel is enough to fully soak existing filter papers and changes the pressure drop over the filter from 0 mbar to around 20 to 30 mbar. This pressure drop has a negative impact on engine startability, lowers the maximum torque and increases the fuel consumption on all trucks somewhat.

Leakage of fuel from inside of the tank through the fuel sender can occur in various situations such as hilly driving, sloshing due to braking, curves, accelerations, parking in slopes, etc. This leakage is causing filter papers of air filters connected to the fuel tank to get soaked with fuel, leading to an increased pressure drop. This pressure drop causes an unbalance of fuel levels on dual tanks which are commonly used in commercial vehicles, as each tank has its own air filter, and clogging occurs mainly on master side. For instance, a pressure drop around 20 to 30 mbar on the master tank filter and 1 mbar on the slave tank filter corresponds to 240 to 360 mm of level difference which may correspond to a significant portion of the fuel tank height. The result is that a significant amount of fuel cannot be consumed also the fuel is carried in the tank.

US 2006/0157117 A1 discloses a filter device in a fuel tank venting system which includes a fuel cap, a vent diaphragm and a vent disc. A valve cavity with a substantially concave bottom is formed in a bottom of the fuel cap. An air passage is formed through the vent disc. A convex surface is formed on a top of the diaphragm projection. The vent diaphragm is retained between the concave bottom and the convex surface. When air is needed for fuel flow, a vacuum within the fuel tank pulls the perimeter of the diaphragm downward, which breaks a seal with the concave bottom to allow air flow which enters the system through an air filter arranged above the diaphragm.

It is desirable to provide a filter device which can avoid soaking of the filter paper due to fluid entering the filter device through the outlet of the filter device.

It is also desirable to provide an arrangement for ventilating a tank comprising at least one filter device.

A filter device, particularly an air breather filter device for ventilating a tank, comprising a housing with a first port being provided as an inlet in normal operation of the filter device and a second port being provided as an outlet under normal operation of the filter device, the housing enclosing at least one filter and an air passage extending from the first port to the second port passing through the filter. Inside the housing a baffle unit is arranged in the housing for covering the at least one first filter in relation to the second port, wherein the baffle unit is arranged to deflect a fluid flow entering the filter device through the second port.

Favourably, the normal operation of the air filter is undisturbed in case a leakage of fuel from inside of the fuel tank occurs. The fuel leaking into the filter device can be evacuated from the filter device without contaminating the filter. The baffle unit is advantageously arranged to deflect a fluid flow coming from the second port so as to prevent the fluid flow hitting the filter directly. The baffle may separate the fluid flow leaking into the filter device into a flow of predominantly liquid fluid and a flow of gaseous fluid, wherein the gaseous flow can enter the filter. Expediently, the baffle unit may be arranged to encourage dripping of a liquid from the baffle unit. Hence, in case of diesel as liquid fluid, creeping of the diesel into the filter can be avoided. The liquid fluid is guided to circumvent the filter reliably.

Expediently, the tank can be a fuel tank, particularly a dual fuel tank where a master and a slave tank are coupled. The tank can also be a urea tank, particularly suitable in cases where the filter device has to be installed below the maximum liquid level.

According to an advantageous embodiment, the baffle unit may split a fluid flow entering the filter device through the second port into a first flow of a gaseous fluid passing the filter towards the first port and a second flow of a liquid fluid flowing along an outside of the outer shell to a bottom portion of the housing. The liquid flow can be reliably deterred from entering the filter.

According to an advantageous embodiment, the baffle unit may comprise a deflector plate facing the second port and overlapping an orifice of the second port. A flow deviation of the leakage fluid flow is enforced by the deflector plate. Particularly, the deflector plate may have a convex profile towards the second port. The shape of the deflector plate can be used to enhance the possibility of draining the liquid from the deflector plate in an area away from the filter, for instance by providing an umbrella-like profile.

Particularly, a passage may be provided from the deflector plate to the outside of the baffle unit which guides a liquid fluid from the deflector plate to the outside of the baffle unit towards the bottom part. Advantageously, the passage enforces a flow path for the liquid fluid thus blocking the fluid from entering the first filter.

According to an advantageous embodiment, the baffle unit may have a shell extending between the first and the second port, the shell being terminated at its side intended to be arranged proximate to the second port by a cover arranged at a distance from the deflector plate. Advantageously, the cover may have a maximum height in its middle. Liquid is prevented from dripping into the filter covered by the cover. In case liquid would hit the cover, the curvature of the cover guides the liquid away from the centre of the cover. Expediently, an orifice is provided in the centre of the cover, providing an outlet for fluid passing the filter inside the baffle unit in normal operation. Advantageously, the cover may include an orifice for passing a fluid. For instance, the orifice may be a tube with openings for the fluid, the tube extending from the cover towards the second port. The tube may support the deflector plate, thus increasing the stability of the baffle unit.

According to an advantageous embodiment, the cover and the deflector plate may enclose a portion of the air passage between the first port and the second port. A fluid flow leaking in through the second port has to perform two deflections by about 180° each in order to enter the orifice in the cover.

According to an advantageous embodiment, the baffle unit may have a collar pointing outwardly. Particularly, the collar may be arranged at the bottom of the baffle unit opposing the cover. Particularly, the collar may comprise one or more openings. Fluid flow can pass through the collar.

According to an advantageous embodiment, a second filter may be arranged in a fluid passage between the baffle unit and the first port, the fluid passage being arranged outside the first filter. The fluid passage may be provided for liquid fuel coming from the second port. Expediently, the second filter may be arranged concentric with the at least one filter in the baffle unit. Alternatively, the second filter may be an additional filter element arranged eccentrically to the at least one first filter.

The second filter may be used as fuel filter. The second filter may be made of the same material as the at least one filter enclosed in the baffle unit. The second filter may be made of paper or of fibres, particularly plastic fibres. Favourably, the second filter has filter characteristics equal or at least similar to the first filter. Using plastic fibres, e.g. polyester, makes it easier to secure a sealing between the material of the second filter and the material of the housing, e.g. via a welding process, compared to paper as filter material.

The second filter may be ring-shaped or washer-shaped. The second filter secures filtration of the gaseous fluid, e.g. air, in case it is not soaked by the liquid fuel, e.g. diesel or urea or the like, and guarantees a release of liquid without soaking the at least one filter itself.

According to an advantageous embodiment, the collar may cooperate with, particularly overlap, the second filter. Expediently, the collar can be used to stabilize the second filter.

According to an advantageous embodiment, the baffle unit may comprise means for blocking a liquid film on the baffle unit to creep into the at least one filter. Such means may be one or more of an undercut at an underside of the deflector plate, a groove at the underside, a labyrinth geometry, for instance a suitable edge structure at a flow passage of the liquid fluid, or any combination thereof. Particularly, the filter device may be provided with a labyrinth geometry for sealing between parts in the filter device. For instance, the labyrinth geometry may be arranged between the first port and the second filter, thus protecting the second filter and the first filter from water entering through the first port. Such a situation can happen when the filter device is mounted in a vehicle where the filter device experiences rough conditions during use of the vehicle. For instance, rain water can enter the filter device under unfavourable conditions.

According to an advantageous embodiment, the housing may comprise a conical bottom portion. Advantageously, the conical bottom reduced the speed of the gaseous fluid in the filter device thus being favourable for the pressure drop in the filter.

According to another aspect of the invention, an arrangement for ventilating a tank, wherein a filter device is provided, comprising a housing with a first port being provided as an inlet in normal operation of the filter device and a second port being provided as an outlet under normal operation of the filter device, the housing enclosing at least one filter and an air passage extending from the first port to the second port passing through the filter, and wherein inside the housing a baffle unit is provided covering the at least one first filter in relation to the second port, wherein the baffle unit is arranged to deflect a fluid flow entering the filter device through the second port.

Advantageously, the invention can be used for ventilating of tanks which require gas filters, particularly air filters, where there is a risk that a liquid fluid may enter the filter device through the outlet of the filter device. A favourable usage is made in fuel tank arrangements, such as dual tanks where fuel is transferred from a slave tank to a master tank, or urea tanks where the air filter has to be installed below the maximum urea level in the urea tank.

Particularly, the baffle unit may shield the at least one filter against the second port. Expediently, the filter is protected against liquid fluids entering the filter device through the outlet port.

According to an advantageous embodiment, the at least one filter device is arranged at a master tank of a dual tank system to which fuel is supplied from a second tank of the dual tank system. Advantageously, the risk of an undesired pressure drop on the master tank filter which may correspond to a significant portion of the fuel tank height can be avoided. As a result the amount of fuel available in the slave tank can be consumed in the master tank.

BRIEF DESCRIPTION OF THE DRAWINGS

The present invention may best be understood from the following detailed description of the embodiment(s), but not restricted to the embodiments, wherein is shown schematically.

DETAILED DESCRIPTION

Figure 1A:
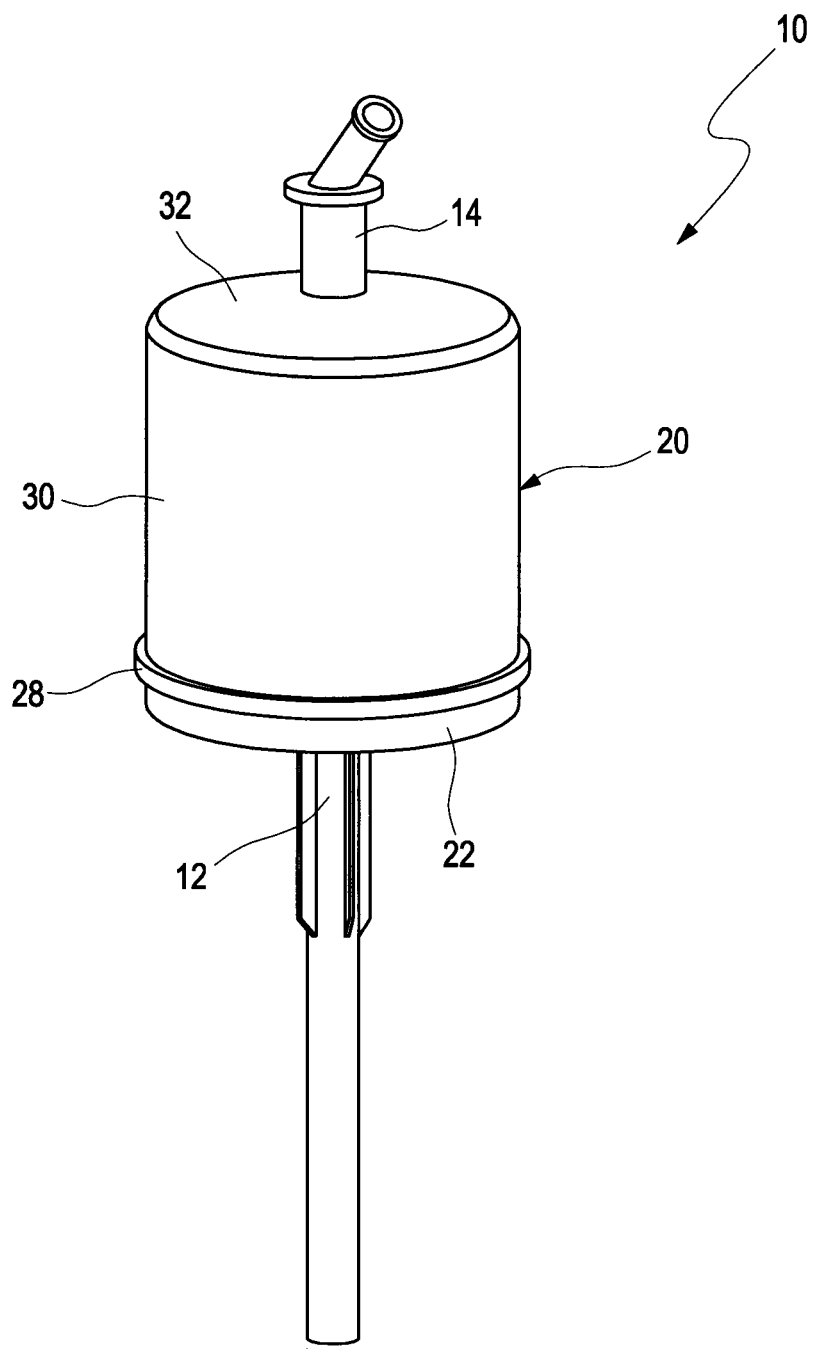
FIG. 1a, 1b a perspective view of a first example embodiment of a filter device according to the invention (FIG. 1a), and in an exploded view the example embodiment of the filter device (FIG. 1b)
Figure 1:
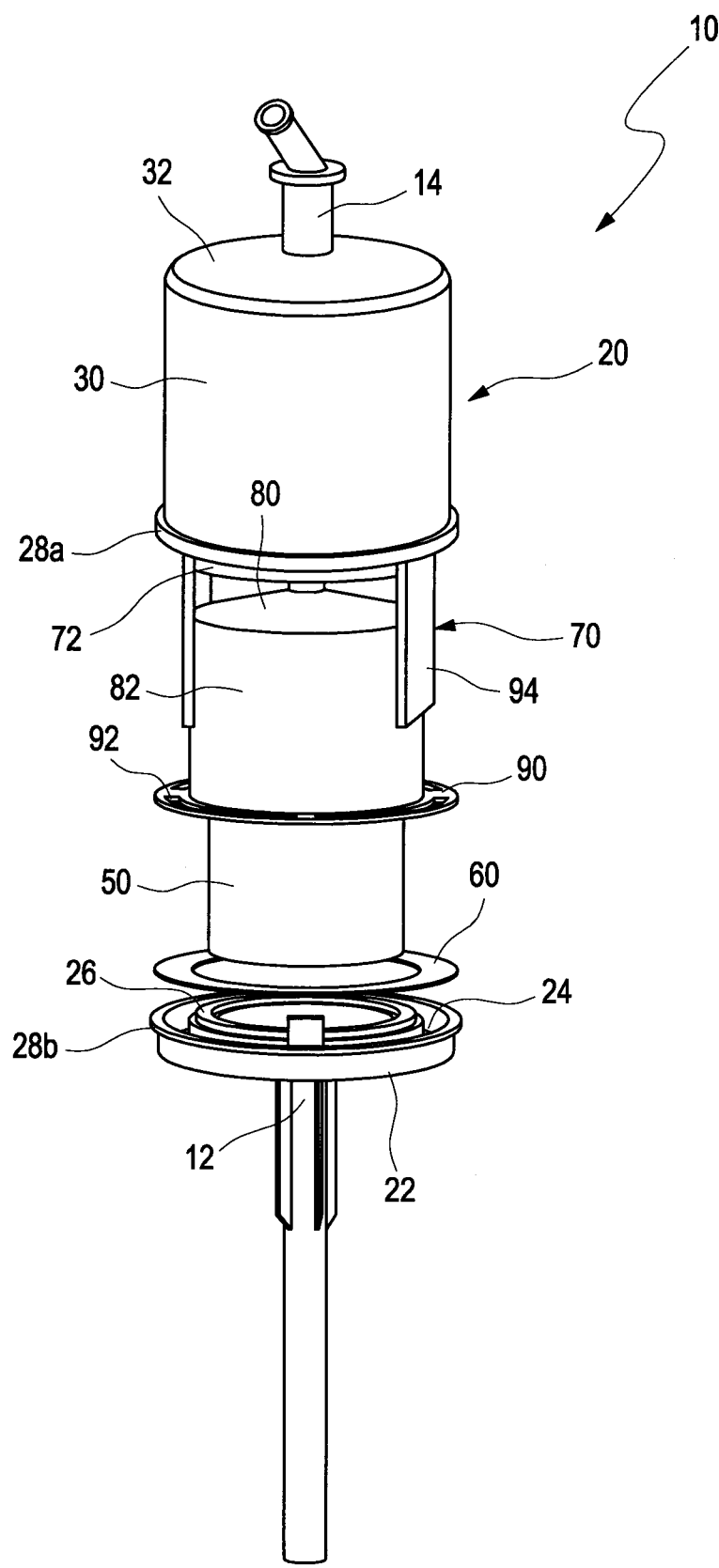

In the drawings, equal or similar elements are referred to by equal reference numerals. The drawings are merely schematic representations, not intended to portray specific parameters of the invention. Moreover, the drawings are intended to depict only typical embodiments of the invention and therefore should not be considered as limiting the scope of the invention.

FIGS. 1a, 1b depict a perspective view (FIG. 1a) and an exploded view (FIG. 1b) of a first example embodiment of a filter device 10 according to the invention.

The filter device 10 comprises a housing 20 with a first port 12 being provided as an inlet (for instance an air inlet) in normal operation of the filter device 10 and a second port 14 being provided as an outlet (for instance an air outlet) under normal operation of the filter device 10. Tubes or hoses may be attached to the ports 12, 14 (not shown). The second port 14 is attached to a tank, for instance a fuel tank (not shown) which is to be ventilated through the filter device 10.

The housing 20 may have a generally cylindrical or slightly conical shape with a cylindrical shell 30 arranged around the longitudinal extension of the filter device 10, and a bottom part 22 and a top part 32. Expediently, the bottom part 22 is cup-shaped with a low wall portion in longitudinal direction. The first port 12 is arranged in the centre of the bottom part 22, and the second port 14 is arranged in the centre of the top part 32. The shell 30 is connected to the bottom part 22 via a connection shown as a bulge 28 which may be a snap-in connection, a bonded or welded joint or the like. For instance, the shell 30 as well as the bottom part 22 may be provided with a corresponding collar 28a, 28b forming the bulge 28.

The bottom part 22 comprises a groove 24 which is arranged between collar 28b and an annular socket 26 inside the housing 20. The annular socket 26 is arranged to receive a filter 50 in its inner area so that the filter 50 is safely fixed in the annular socket 26. The filter 50 has a closed bottom, e.g. a metal bottom, and an exit at its top for the fluid passing through it. Expediently the annular socket 26 is provided with one or more openings for letting the fluid pass from the first port 12 to the outer perimeter 52 of the filter 50.

Advantageously, the bottom part 22 and/or a tube attached to the first port 12 may have a conical shape so that the radius of the bottom part 22 and/or tube tapers with increasing distance from the second port 14, thus advantageously reducing the speed of the gaseous fluid in the filter device 10 which has a favourable effect for a pressure drop in the filter device 10.

The housing 20 may be made of plastics or any other convenient material. Inside the housing 20 of the filter device 10 an air passage is provided extending from the first port 12 to the second port 14 passing through the filter 50 in normal operating conditions of the filter device 10. The filter 50 is enclosed by a baffle unit 70, wherein the baffle unit 70 is arranged to deflect a fluid flow coming from the second port 14.

Filter 50 may be a cylindrical annular body made of filter paper or the like. A gaseous fluid coming from the first port 12 may enter the filter 50 through its outer surface (outer perimeter 52) and leave the filter 50 at its inner surface (inner perimeter 54) and be discharged from the filter device 10 through the second port 14.

The baffle unit 70 may expediently, like the filter 50, exhibit a cylindrical shape with a shell wall 82 which is open at its bottom end near the first port 12 and having a cover 80 at its top near the second port 14 (in its position of the filter assembly). In the centre of cover 80, an orifice is arranged for letting pass through a fluid, e.g. coming from filter 50.

The baffle unit 70 comprises a deflector plate 72 connected to the shell 82 by holders 94, the deflector plate 72 facing the second port 14 when arranged in the filter device 10. The holders 94 may be perforated for letting a fluid, e.g. fuel, pass through. The deflector plate 72 has a convex shape so that its rim is farther away from the second port 14 than its centre. The deflector plate 72 is basically oriented parallel to the cover 80 and covers the orifice. At its underside, an undercut may be arranged which shall prevent creeping of a fluid into the orifice 76. The orifice 76 may be provided by a tube with one or more openings in its side wall.

The cover 80 and the deflector plate 72 enclose a passage which is part of the gaseous fluid passage e.g. air passage, between the first port 12 and the second port 14.

At its bottom end the baffle unit 70 comprises a collar 90 pointing outwardly. The collar 90 comprises one or more openings 92 for letting a fluid pass through. As can be seen in FIG. 1b, the collar 90 corresponds to the position of the groove 24 of the bottom part 22 of housing 20.

Further, the filter device 10 comprises a second filter 60, which may be a plane washer, and which is arranged close to the first port 12 in the groove 24 of the bottom part 20. The collar 90 of the baffle unit 70 coincides with the second filter 60 so that a first fluid flowing inside the baffle unit 70 passes through the first filter 50 and a second fluid, particularly a liquid fluid, flowing outside the baffle unit 70 may flow through the second filter 60 before being discharged through the first port 12. The socket 26 separates the first filter 50 and the second filter 60 at the side of the first port 12. A fluid, e.g. air, entering the bottom part 22 through first port 12 can only enter the first filter 50, particularly through its outer perimeter 52. The fluid entering through the first port is blocked by socket 26 and shell 82 of the baffle unit 60 from entering the second filter 60.

Figure 2:
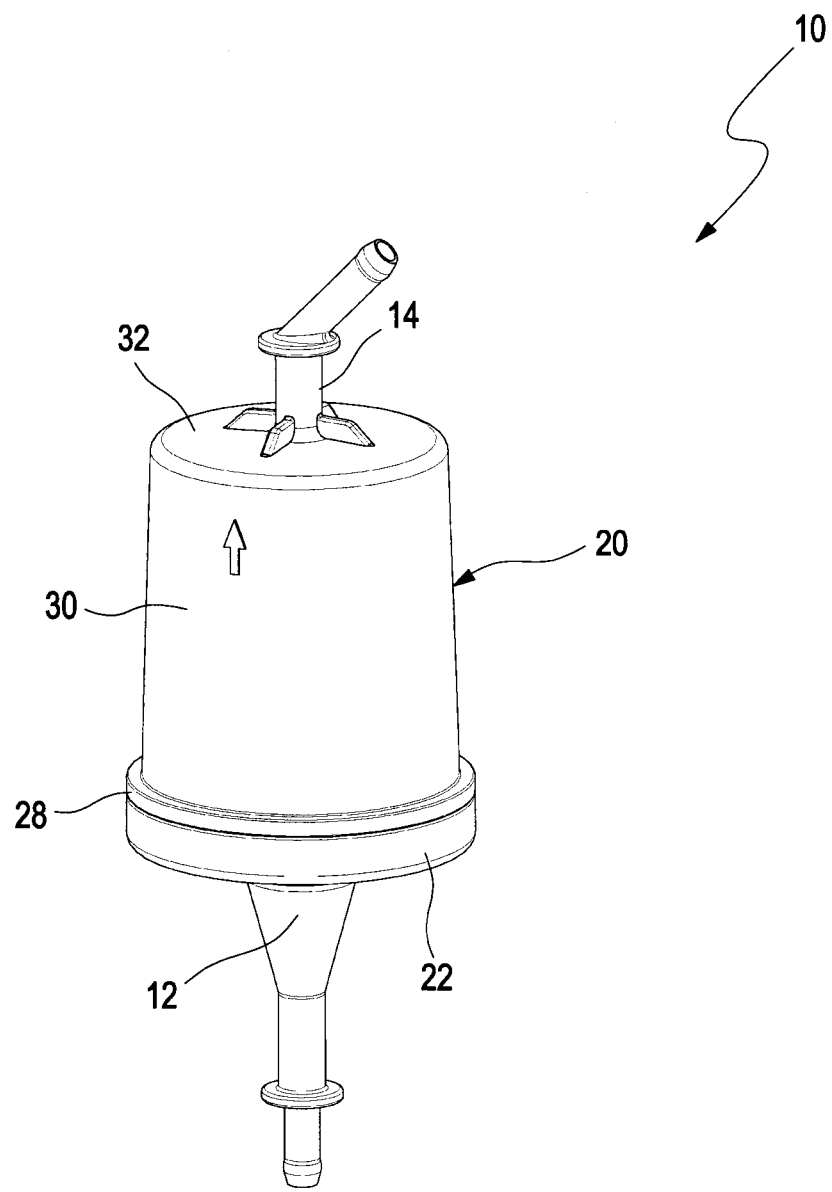
FIG. 2a-2d a perspective view of a first example embodiment of a filter device according to the invention (FIG. 2a), and in an exploded view the example embodiment of the filter device (FIG. 2b), a longitudinal cut view (FIG. 2c), and the longitudinal cut with some elements removed (FIG. 2d)
Figure 2:
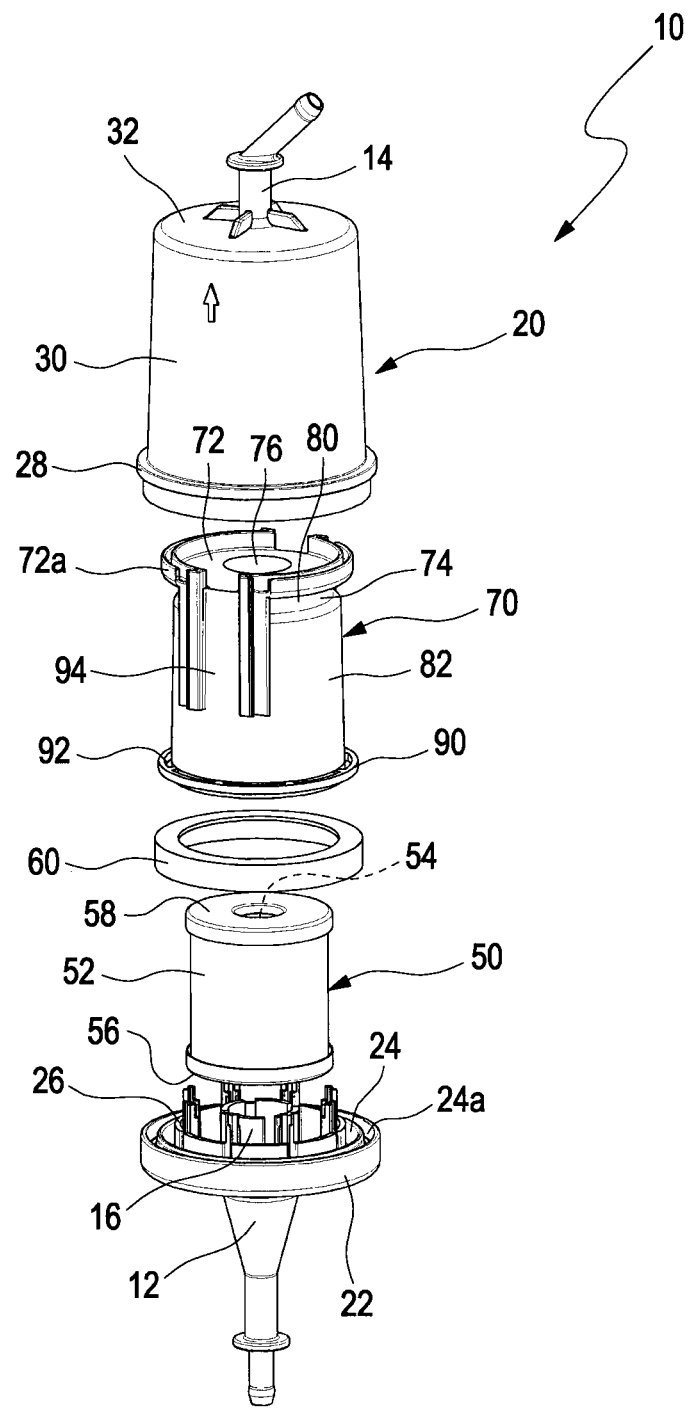
Figure 2:
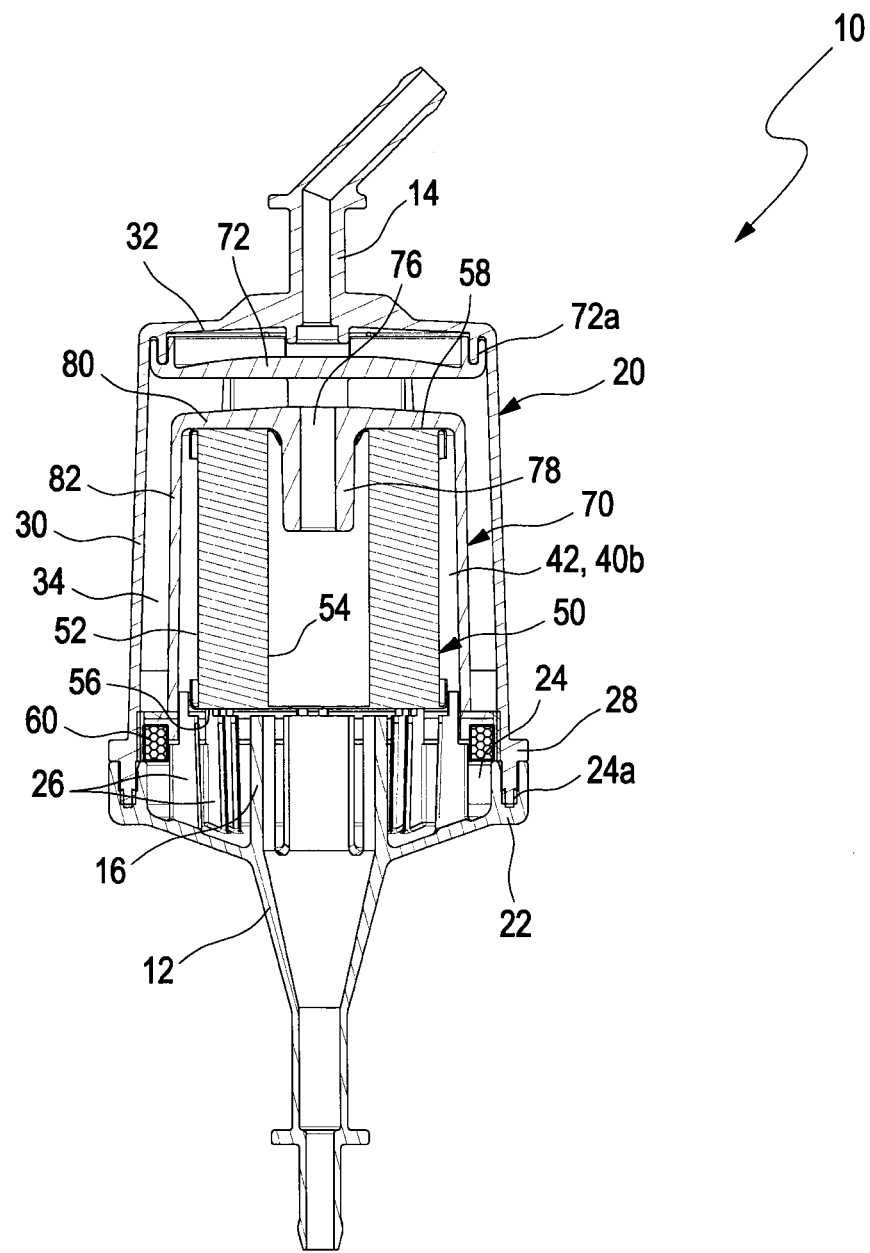
Figure 2D:
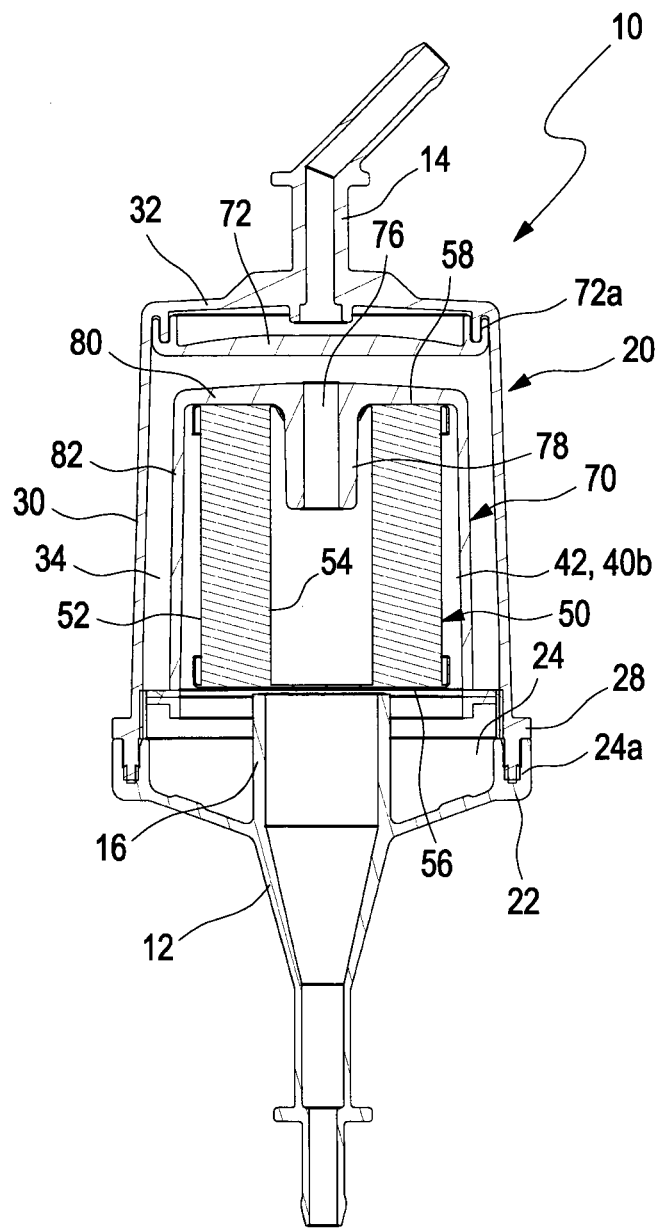

FIGS. 2a to 2d depict a second embodiment of a filter device 10 according to the invention. A perspective view of the filter device 10 is shown in FIG. 2a, and in an exploded view in FIG. 2b. FIGS. 2c and 2d show longitudinal cut views with some elements removed for clarity in FIG. 2d.

It should be mentioned that, although the filter device 10 is shown in all embodiments with a filter 50 having a vertical axis, the filter device 10 can also be a horizontal arrangement by tilting the filter device 10 by 90° so that the filter axis is arranged horizontally. However, it is expedient to leave the first port 12 in the lowest position of the filter device 10.

As in the first embodiment, the filter device 10 comprises a housing 20 with a first port 12 being provided as an inlet (for instance an air inlet) in normal operation of the filter device 10 and a second port 14 being provided as an outlet (for instance an air outlet) under normal operation of the filter device 10. Tubes or hoses may be attached to the ports 12, 14 (not shown). The second port 14 is attached to a tank, for instance a fuel tank (not shown) which is to be ventilated through the filter device 10.

The housing 20 may have a generally cylindrical or slightly conical shape with a cylindrical shell 30 arranged around the longitudinal extension of the filter device 10, and a bottom part 22 and a top part 32. As can be seen, the first port 12 is provided with a conical transition from a cylindrical tube to the bottom part 22. Expediently, the bottom part 22 is cup-shaped with a low wall portion in longitudinal direction.

The first port 12 is arranged in the centre of the bottom part 22, and the second port 14 is arranged in the centre of the top pan 32. The shell 30 is connected to the bottom part 22 via a plug-in connection, wherein a lower end of the shell 30 is plugged into a groove 24a of the bottom part. The groove 24a surrounds a groove 24 arranged in the bottom part 22. A bulge 28 is provided at the outer surface of the shell 30 which bulge 28 is flush with the outer perimeter of the bottom part 22. The side of the bulge 28 oriented towards the bottom part 22 can be used for sealing the housing 20. The shell 30 slides with its lower rim 84 into the groove 24a establishing a stable and tight connection to the bottom part 22.

The groove 24 is arranged between the outer perimeter of the bottom part 22 and a generally annular socket 26 inside the housing 20. The annular socket 26 is arranged to receive a filter 50 in its inner area so that the filter 50 is safely fixed in the socket 26. Filter 50 may be a cylindrical annular body made of filter paper or the like. A gaseous fluid coming from the first port 12 may enter the filter 50 through its outer surface (outer perimeter 52) and leave the filter 50 at its inner surface (inner perimeter 54) and be discharged from the filter device 10 through the second port 14.

The socket 26 may by particularly provided with a labyrinth-geometry to minimize the risk of liquid fluid, e.g. water, entering through the first port 12 reaching filter 50 and a second filter 60. In case a large amount of liquid fluid enters, both filters 50, 60 can be reached. However, the liquid fluid is directed towards the bottom plate of first filter 50 and cannot splash directly on the first filter 50 or second filter 60.

The labyrinth-geometry advantageously seals between parts in the bottom region of the filter device 10.

As can be seen in FIGS. 2c and 2d, the bottom part 22 has a more conical shape compared to the first embodiment, which in addition to the conical transition of the first port 12 further reduces the pressure loss over the filter device 10.

The second filter 60 is provided as a ring which may have the same filter characteristics as the first filter 50 and is expediently made of e.g. polyester fibres. This makes it easy to secure sealing between polyester filter material of the second filter 60 and the housing material of the housing 20 during welding process compared to paper as filter material. The second filter 60 rests on the inner wall of groove 24a in groove 24 of the bottom part 22.

The filter 50 has an annular shape with a closed bottom 56, e.g. covered with a metal bottom, and an exit at its top 58 for the fluid passing through it. The filter 50 rests on the socket 26 and closely over a tube-like socket 16 which extends from the first port 12 to a position close to the filter bottom 56. The fluid, e.g. air can pass through the clearance between the outlet of socket 16 and the filter bottom 56 to the outer perimeter of the filter 50 for entering the filter 50.

Expediently the annular socket 26 is provided with one or more dents arranged in longitudinal direction of the filter device assembly (FIG. 2b) for letting the fluid pass from the first port 12 to the outer perimeter 52 of the filter 50.

The filter 50 is positioned inside a baffle unit 70 which is open towards the bottom part 22 and nearly fully closed towards the top 32 of the housing 20. The baffle unit 70 may expediently, like the filter 50, exhibit a cylindrical or conical shape with a shell wall 82 which is open at its bottom end near the first port 12 and having a cover 80 at its top near the second port 14 (in its position of the filter assembly). In the centre of cover 80, an orifice 76 is arranged for letting pass through a fluid, e.g. coming from filter 50. The orifice 76 is provided with a tube 78 extending into the central annulus of the first filter 50, so that the filter 50 is secured inside the baffle unit 70.

The baffle unit 70 comprises a deflector plate 72 connected to the shell 82 by holders 94, the deflector plate 72 facing the second port 14 when arranged in the filter device 10. The deflector plate 72 is basically oriented parallel to the cover 80 and covers the orifice 76. The cover 80 and the deflector plate 72 enclose a passage which is part of the gaseous fluid passage 40 e.g. air passage, between the first port 12 and the second port 14.

The baffle unit 70 is secured inside the housing 20 by a plug-in connection at its top. The deflector plate 72 is provided with an annular channel 72a as a sealing labyrinth geometry, which cooperates with an annular channel at the inner side of the top 32 of the housing 20 to form an interdigital connection (FIG. 2c).

At its lower end the baffle unit 70 is provided with a collar 90 which is arranged above the position of the second filter 60. The collar 90 is perforated with one or more openings 92 for letting a fluid pass through the openings 92 as well as through the second filter 60.

Figure 3:
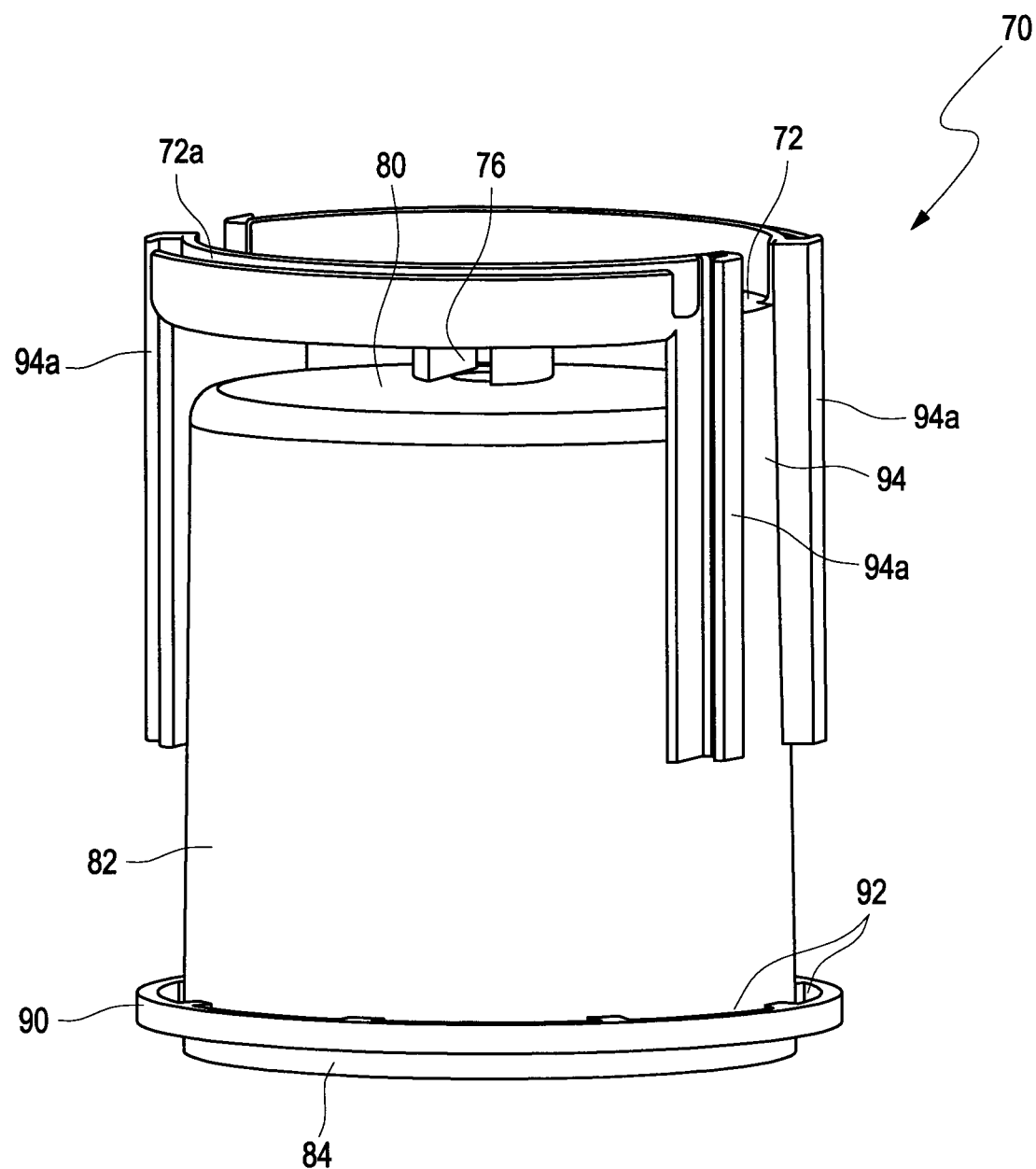
FIG. 3a, 3b a baffle unit shown in FIGS. 2b-2d according to the second embodiment according to the invention in a side view (FIG. 3a) and a longitudinal cut view (FIG. 3b)
Figure 3:
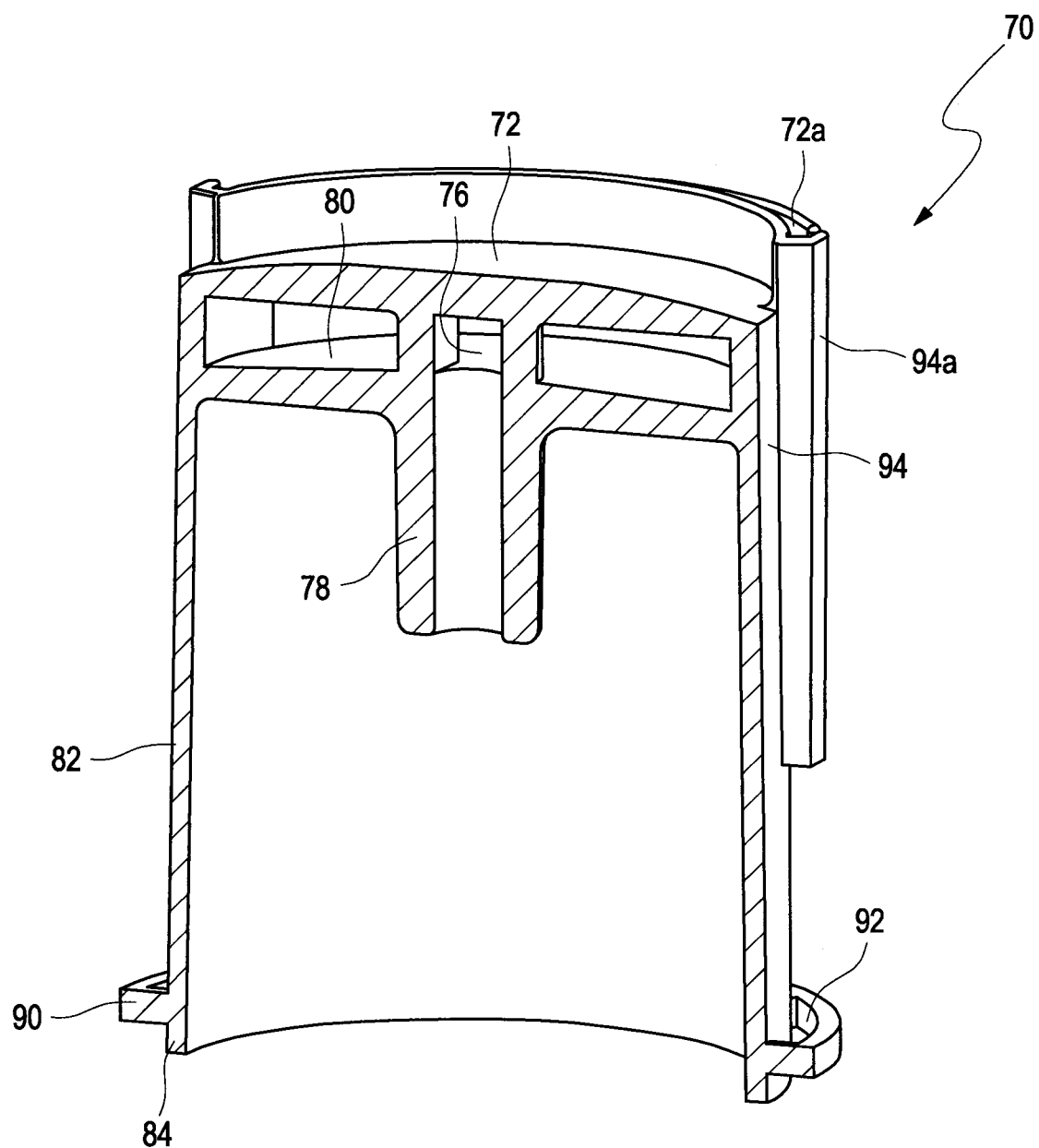

FIGS. 3a and 3b show the baffle unit 70 of FIGS. 2b-2d in more detail in a side view (FIG. 3a) and a longitudinal cut view (FIG. 3b). The annular channel 72a arranged on the top surface of the deflector plate 72 is interrupted forming a clearance between segments of the annular channel 72a, for instance two diametrically arranged clearances are shown in the Figure. A fluid entering the filter device 10 through the second port 14 will be caught in the volume between the deflector plate 72 and the second port 14 and can leave the space through the clearances. For each clearance a holder 94 is provided which connects the deflector plate to the shell 82, thus forming a "water fall" forcing a fluid, e.g. air and fuel, to move down the baffle unit 70, and a gaseous fluid, e.g. air, can climb up behind the "water fall" (holder 94) and then go through the orifice 76, whereas a liquid fluid, e.g. fuel, will continue to move down and out through the second filter 60. The edges 94a of the holder 94 are provided with a rim 92a folded inwardly towards the surface of the holder 94 thus generating a labyrinth geometry as an efficient stop for a liquid which would otherwise creep around the edges 94a of the holder 94 towards the orifice 76. Under reasonable circumstances a liquid will not be able to enter the orifice 76 and the filter 50 below it.

Figure 4:
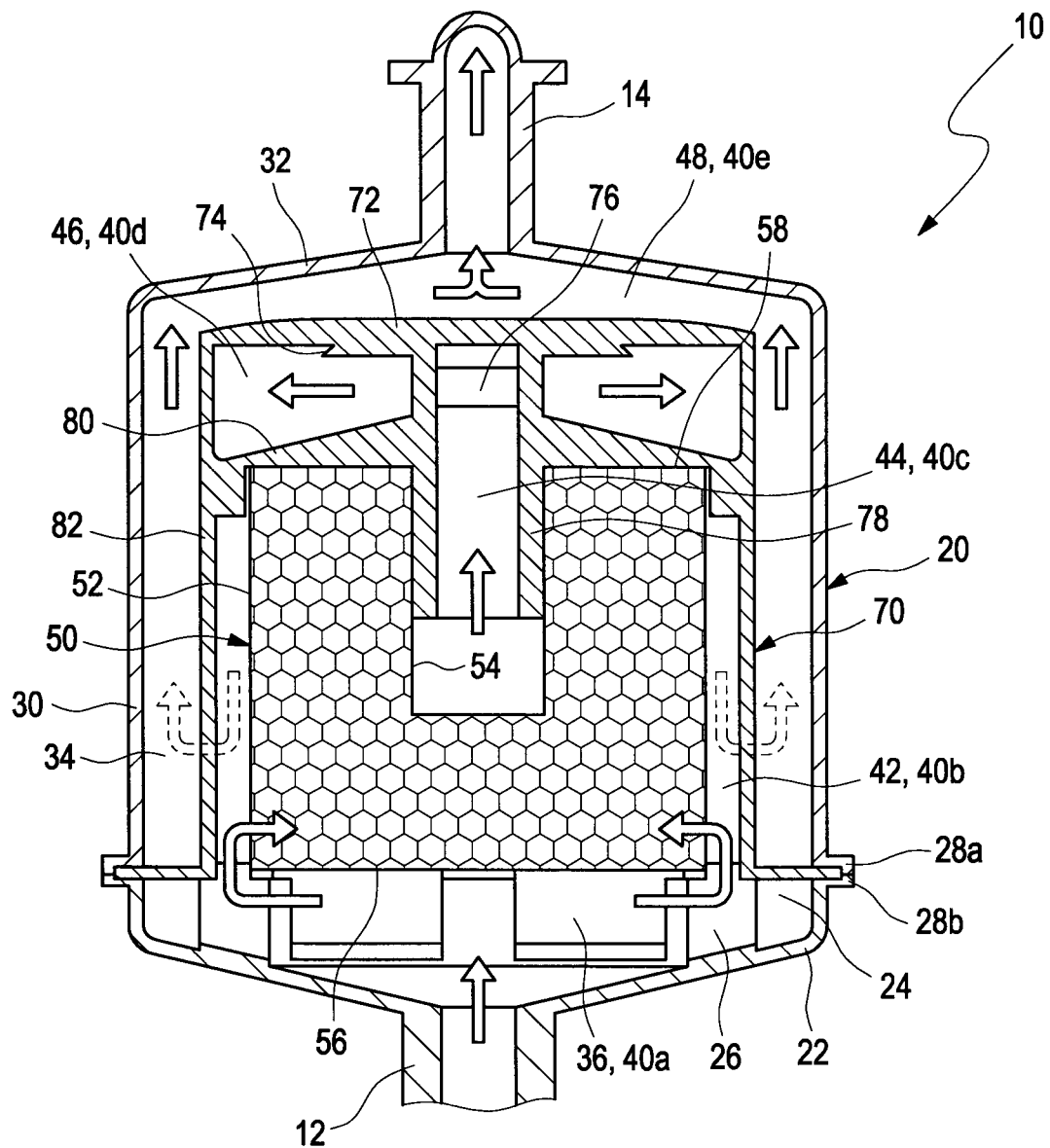
FIG. 4 a longitudinal cut view of an example embodiment of a filter device in normal operation with normal flow conditions.

FIG. 4 illustrates a normal operation of the filter device 10 shown in the FIGS. 1a, 1b. The passage of a gaseous fluid, e.g. air, through the filter device 10 is indicated by bold arrows. The broken arrows indicate that a liquid fluid can flow down at the outside of the baffle unit 70.

The fluid, e.g. air, enters the filter device 10 through the first port 12 in a volume 36 which is a part 40a of a fluid or air passage 40 and is guided through a clearance between socket 26 and the filter bottom 56 in the bottom part 22 to a volume 42 around the outer perimeter 52 between the shell 82 of the baffle unit 70 and the filter 50, the volume 42 forming part 40b of passage. The fluid enters the annular filter 50 at its outer perimeter 52 and exits filter 50 at its inner perimeter 54 into a volume 44 (part 40c of passage 40) formed by a tube 78 connected to the orifice 76 and extending into the central annulus of the filter 50. The upper annulus like portion of the filter 50 is fixed by the tube 78 in its centre and the shell 82 and top 80 of the baffle unit 70.

The baffle unit 70 comprises a deflector plate 72 connected to the shell 82 by holders 94 (not shown in this cut view), the deflector plate 72 facing the second port 14 when arranged in the filter device 10. The holders 94 may be perforated for letting a fluid, e.g. fuel, pass through. The deflector plate 72 has a convex shape so that its rim is farther away from the second port 14 than its centre. The deflector plate 72 is basically oriented parallel to the cover 80 and covers the orifice 76. At its underside, an undercut 74 is arranged which shall prevent creeping of a fluid into the orifice 76. The orifice 76 may be provided by a hole in the top 80 or a tube extending between the top 80 and the deflector plate 72 with one or more openings in its side wall.

At its bottom end the baffle unit 70 comprises a collar 90 pointing outward. The collar 90 comprises one or more openings 92 for letting a fluid pass through. As can be seen in FIG. 1b, the collar 90 corresponds to the position of the groove 24 of the bottom part 22 of housing 20.

The fluid leaves the filter passage through orifice 76 into volume 46 between the cover 80 and the deflector plate 72 (part 40d of passage 40) and is subsequently collected in volume 48 (part 40e of passage 40) above the deflector plate 72 in front of the second port 14 where it is discharged from the filter device 10 towards, e.g., a tank to be ventilated (not shown).

Figure 5A:
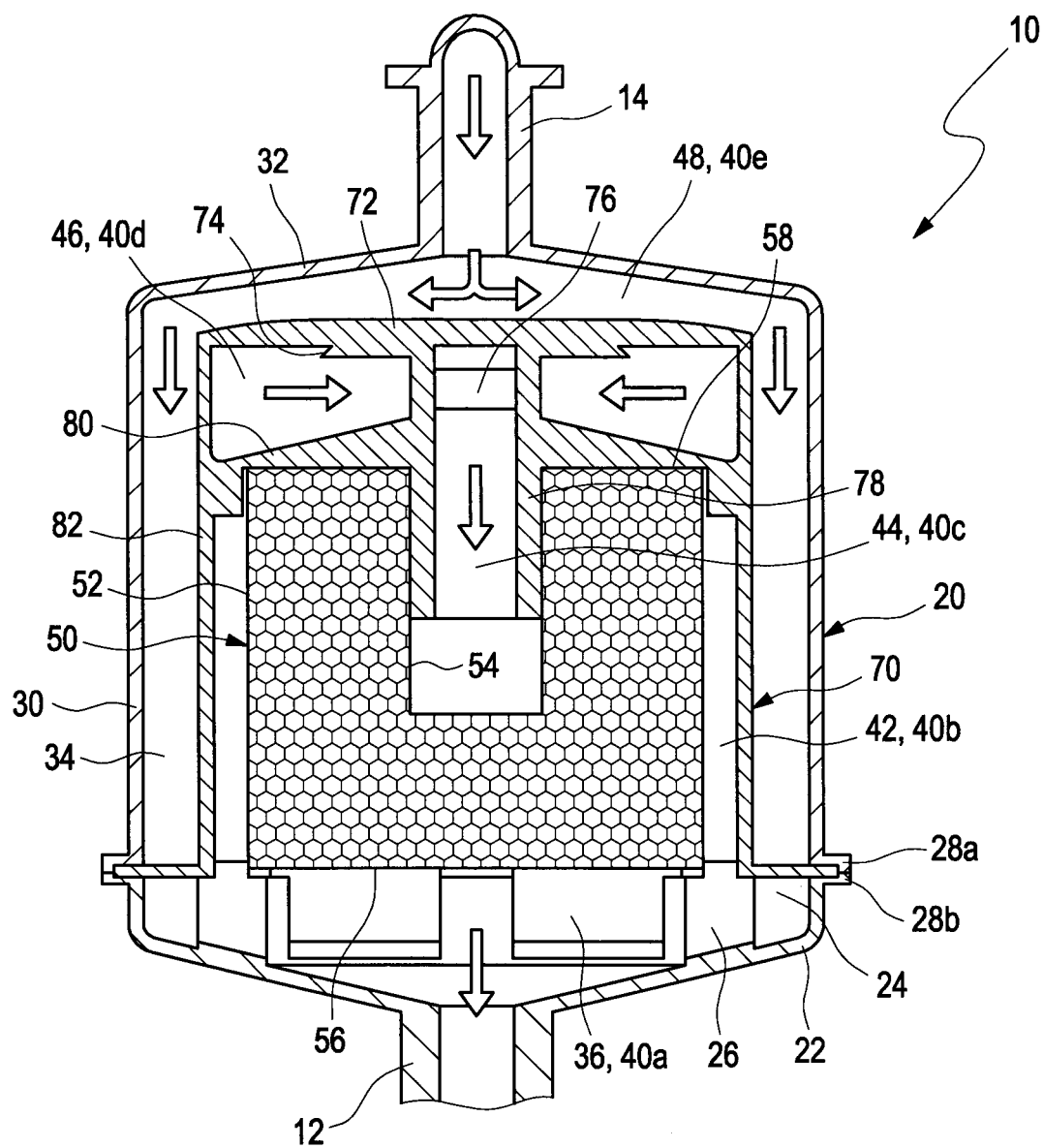
FIG. 5a, 5b a longitudinal cut view an example embodiment of the filter device of FIG. 4 with a fluid entering the filter device through a second port indicating the passage of a gaseous fluid (FIG. 5a) and the passage of a liquid fluid (FIG. 5b) through the filter device.
Figure 5:
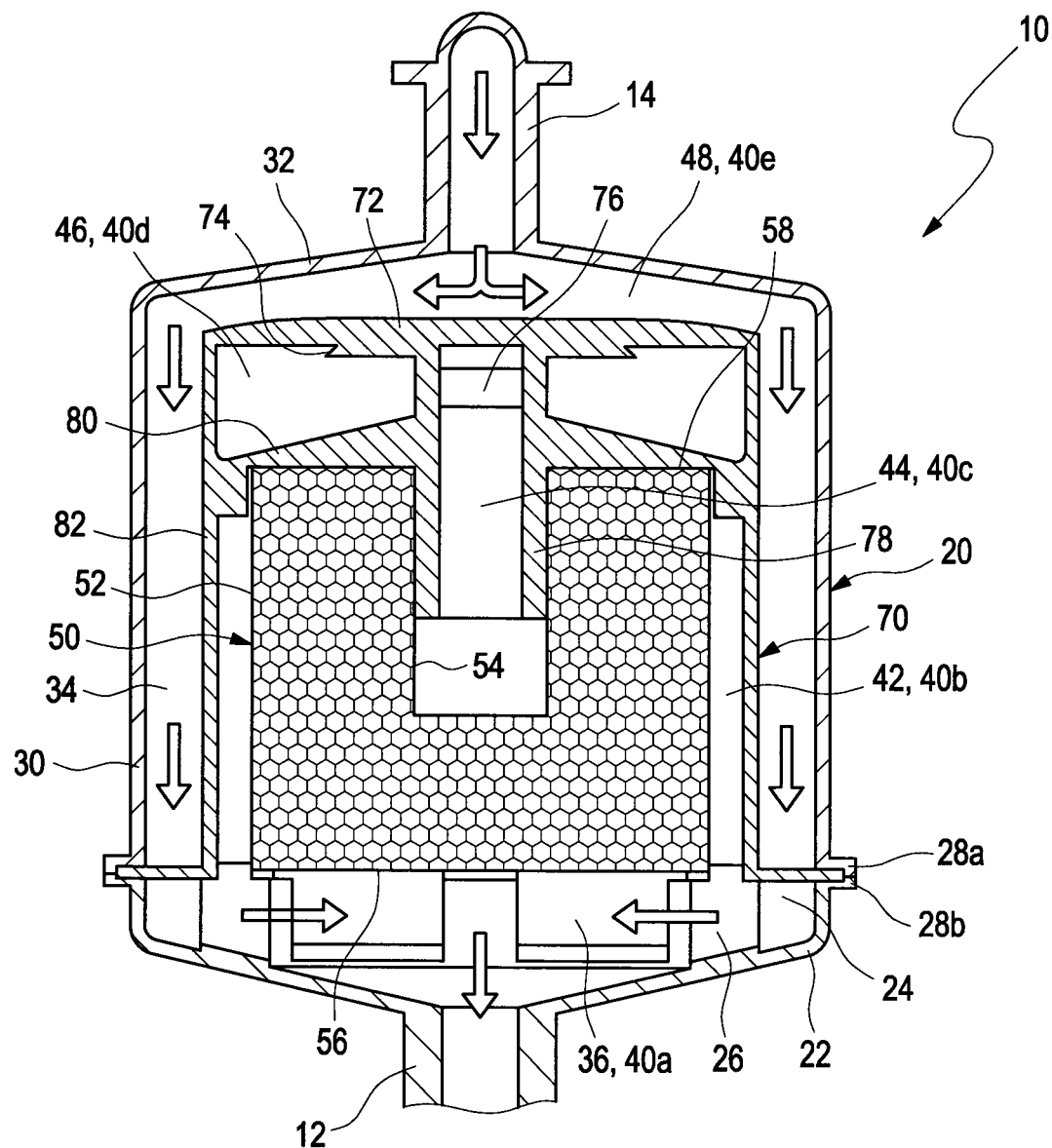

FIGS. 5a, 5b illustrate a situation where a fluid flow, particularly a mixture of gaseous and liquid fluids, e.g. air and fuel, enters the filter device 10 through the second port 14. The baffle unit 70 splits the fluid into a first flow of a gaseous fluid (FIG. 5a) passing the filter 50 towards the first port 12 and a second flow of a liquid fluid (FIG. 5b) flowing along an outside of the outer shell 82 through volume 34 surrounding the shell 82 of the baffle unit 70 to the bottom portion 22 of the housing 20, passing through the second filter 60 before being discharged through the first port 12. The fluid can be collected there or be discharged.

As can be seen in FIG. 5a, the gaseous fluid experiences twice an inversion of its direction before entering the filter 50 through orifice 76, one in front of the deflector plate 72 and one before entering volume 46 between the deflector plate 72 and cover 80.

As the deflector plate 72 overlaps the orifice of the second port 14, the liquid portion (FIG. 5b) of the fluid hits the deflector plate 72 which is formed in a way to encourage dripping of a liquid from its surface, which is supported e.g. by its convex shape. In case the liquid creeps to the backside of the deflector plate 72, the baffle unit comprises means, e.g. an undercut 74 at the backside of the deflector plate 72, for preventing a liquid film on the baffle unit 70 to creep into filter 50. The undercut 74 also encourages dripping of the fluid from the deflector plate 72. A liquid dripping from the deflector plate 72 and hitting cover 80 is directed by its conical or convex shape to the shell 30 so that it can run down in volume 34 towards the bottom portion 22 where it can be discharged through the first port 12 and collected there or discharged.

The deflector plate 72 operates as a separator for liquid and gaseous parts of the fluid entering through the second port 14, thus forcing the liquid fluid to the outside of the baffle unit 70 into volume 34 and letting the gaseous fluid enter into the filter 50 through the orifice 76. Although the reverse fluid flow—reverse compared to normal operation of the filter device 10—is described for the first embodiment, the function of the second embodiment is basically the same for the operation of the deflector plate 72.

Figure 6:
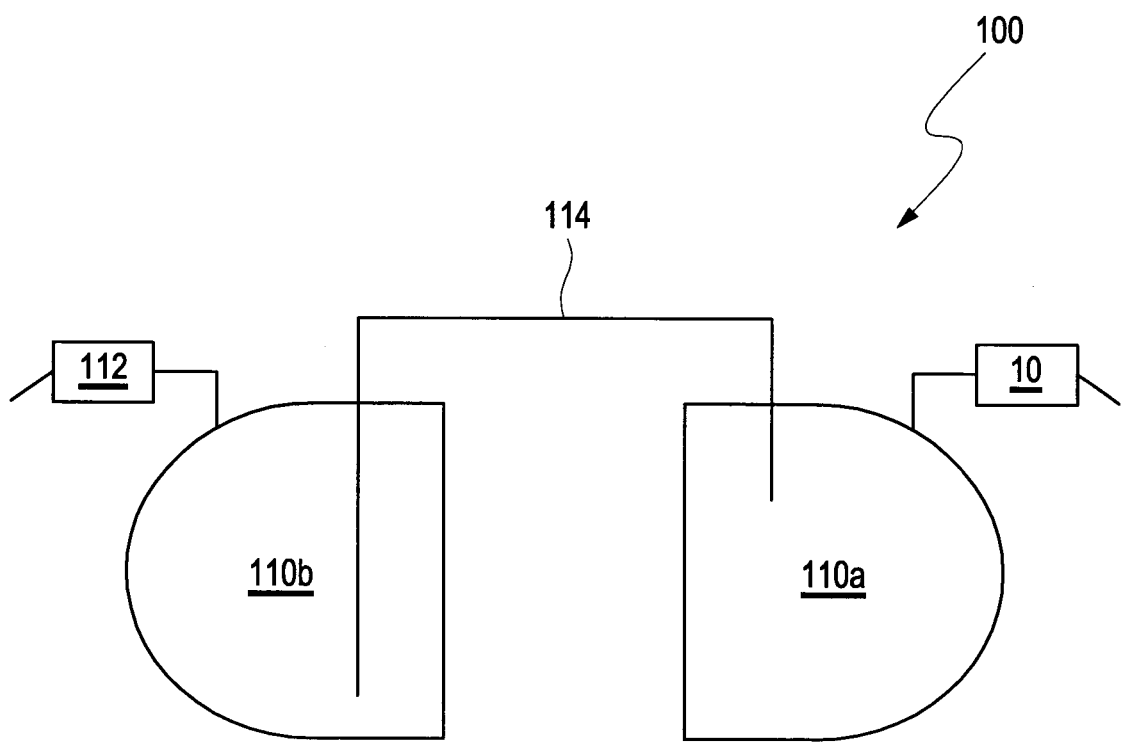
FIG. 6 an example embodiment of a dual tank arrangement including a filter device according to the invention.

FIG. 6 shows an arrangement 100 for ventilating a fuel tank, wherein a filter device 10 is provided as described in the preceding Figures. The arrangement 100 comprises by way of example a dual tank system with a master tank 110a and a slave tank 110b which supplies fuel to the master tank 110a via a supply line 114. The slave tank 110b is ventilated by a filter device 112 which may be of conventional type or embodied according to the invention. The master tank 110a supplies fuel, e.g. diesel, to a combustion engine of a vehicle, particularly a commercial vehicle. The filter device 10 is connected to the master tank 110a for ventilating the same. Even in unfavourable situations such as hilly driving, sloshing of fuel in the tank due to braking, cornering, accelerations, parking on slopes and the like, when the risk occurs that fuel enters the filter device through the outlet of the filter device, soaking of the filter paper and a resulting increase in pressure drop over the filter device 10 can be avoided.

The invention provides a compact and reliable filter device for vehicles, particularly for commercial vehicle such as trucks, busses and the like.

The invention claimed is:

1. A filter device, comprising a housing with a first port being provided as an inlet in normal operation of the filter device and a second port being provided as an outlet under normal operation of the filter device, the housing enclosing at least one first filter and an air passage extending from the first port to the second port passing through the filter, wherein inside the housing a baffle unit is arranged in the housing for covering the at least one first filter in relation to the second port, wherein the baffle unit is arranged to deflect a fluid flow entering the filter device through the second port, wherein the baffle unit comprises means for splitting a fluid flow entering the filter device through the second port into a first flow of a gaseous fluid passing the at least one first filter towards the first port and a second flow of a liquid fluid flowing along an outside of an outer shell to a bottom portion of the housing, wherein at least one second filter is arranged in a fluid passage between the baffle unit and the first port, the fluid passage being arranged outside the first filter and the outer shell.

2. The filter device according to claim 1, wherein the baffle unit comprises a deflector plate facing the second port and overlapping an orifice of the second port.

3. The filter device according to claim 2, wherein a passage is provided from the deflector plate to the outside of the baffle unit which guides a liquid fluid from the deflector plate to the outside of the baffle unit towards the bottom part.

4. The filter device according to claim 1, wherein the baffle unit has a shell extending between the first and the second port, the shell being terminated at its side intended to be arranged proximate to the second port by a cover arranged at a distance from the deflector plate.

5. The filter device according to claim 4, wherein the baffle unit comprises a deflector plate facing the second port and overlapping an orifice of the second port, and wherein the cover and the deflector plate enclose a portion of the air passage between the first port and the second port.

6. The filter device according to claim 1, wherein the baffle unit has a collar pointing outwardly at its bottom end.

7. The filter device according to claim 6, wherein the collar comprises one or more openings.

8. The filter device according to claim 1, wherein the baffle unit has a collar pointing outwardly at its bottom end, and wherein the collar cooperates with the at least one second filter.

9. The filter device according to claim , wherein the baffle unit comprises means for blocking a liquid film on the baffle unit from creeping into the at least one filter.

10. The filter device according to claim 1, wherein the housing comprised a conical bottom portion.

* * * * *